E. E. KLEINSCHMIDT.
TELEPHONE SYSTEM.
APPLICATION FILED SEPT. 8, 1910. RENEWED MAY 29, 1911.
1,062,577.  Patented May 20, 1913.
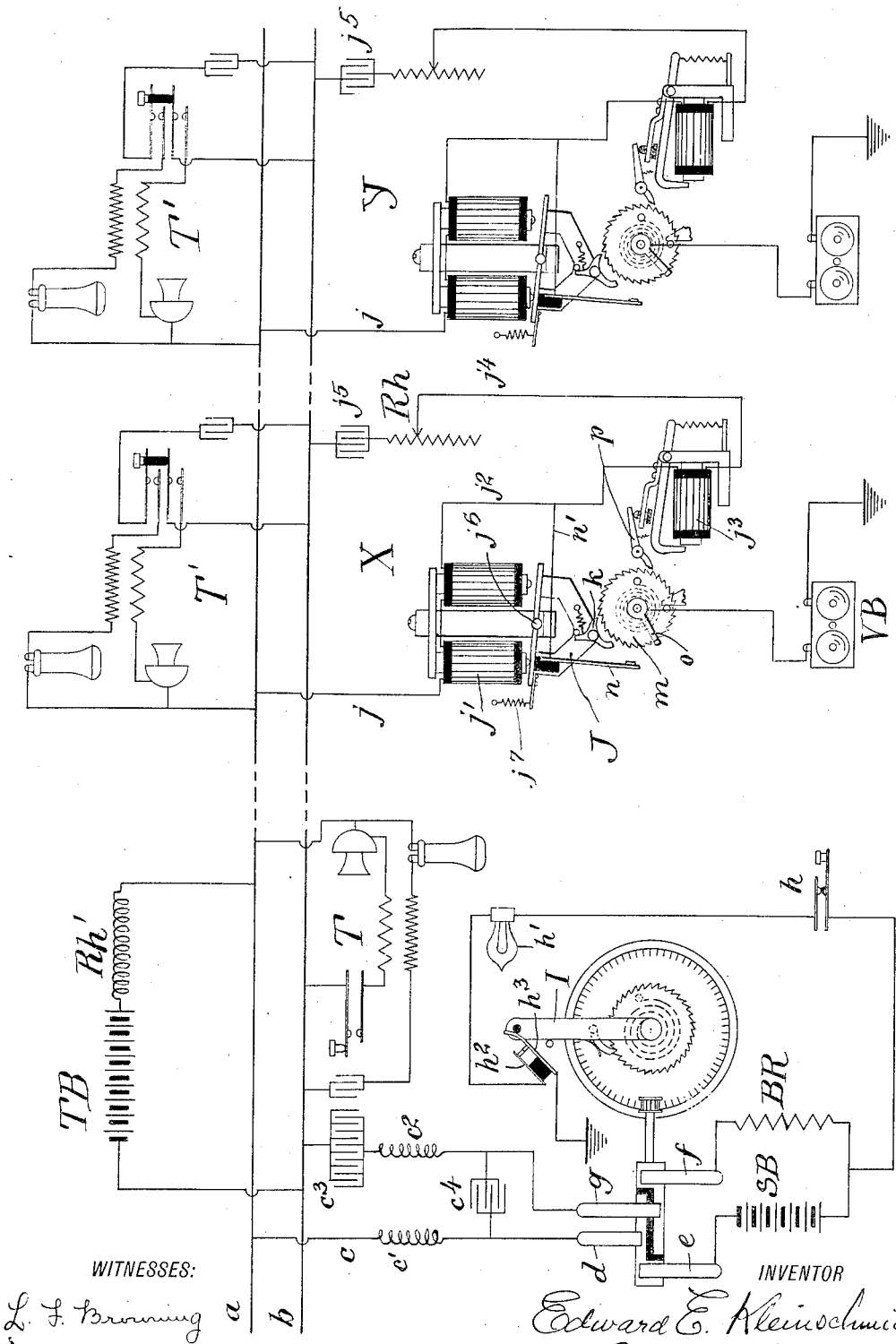
WITNESSES:
L. F. Browning
Mary Dutton
INVENTOR
Edward E. Kleinschmidt
BY
Edward C. Davidson
ATTORNEY

UNITED STATES PATENT OFFICE.

EDWARD E. KLEINSCHMIDT, OF BROOKLYN, NEW YORK, ASSIGNOR TO GENERAL RAILWAY EQUIPMENT COMPANY, A CORPORATION OF MAINE.

TELEPHONE SYSTEM.

1,062,577.  Specification of Letters Patent.  Patented May 20, 1913.

Application filed September 8, 1910, Serial No. 581,009. Renewed May 29, 1911. Serial No. 630,121.

*To all whom it may concern:*

Be it known that I, EDWARD E. KLEINSCHMIDT, a citizen of the United States of America, residing in the borough of Brooklyn, county of Kings, and State of New York, have invented a certain new and useful Improvement in Telephone Systems, of which the following is a specification.

This invention relates to selective systems in which there is a plurality of subscribers' stations connected with a central office. The main circuit is composed of two conductors across which the selective source of current and the sub-station selectors are bridged. The telephonic communicating apparatus for all stations is likewise bridged across the main conductors.

The primary purpose of this invention is to provide a single source of current from which a plurality of telephonic apparatus at stations may receive electrical energy. In other words it is proposed to eliminate the use of local batteries. When there is but one such common telephone supply battery it would, preferably, be located at the central office.

The accompanying drawing is a diagram illustrating the invention.

The conductors of the main telephone circuit are marked $a$, $b$. At the central office, the selector source of electrical energy SB, which will hereinafter be called a battery, is in a bridge circuit that may be traced from main conductor $a$ through conductor $c$ including a retardation coil $c'$, commutator brush $d$, commutator plate and brush $e$, through the selector battery thence through a limiting resistance BR, commutator brush $f$, commutator plate and brush $g$, retardation coil $c^2$ and condenser $c^3$ to main line conductor $b$. The retardation coils $c'$, $c^2$ on the side nearest the commutator are bridged by a condenser $c^4$. The use of the condenser $c^4$ and retardation coils is, as is well understood, for the purpose of preventing the bridge connection containing the battery SB from interfering with the telephonic currents. There is a ground connection on this bridge circuit from between the battery SB and balancing resistance BR, through a normally closed key or two point switch $h$, a signaling device such, for instance, as an electric lamp $h'$, contact piece $h^2$, contact spring $h^3$ normally pressed in contact with $h^2$ by lever arm I, and thence to ground. The central office selector apparatus may be of any appropriate type or construction.

The operation, as is well understood, is as follows: When the lever arm I is moved to the right, its retracting spring returns it to normal position of rest and in such return causes it to drive a ratchet wheel that drives appropriate gears by which the commutator is operated to transmit to line reversals of current, the number of such reversals depending upon the extent of movement of the lever. Two sub-stations are shown marked respectively X and Y. At each the selector apparatus is bridged across the main conductors, the circuit being by wire $j$ through winding of selector magnet $j'$ thence by wire $j^2$ through the winding of a detent controlling magnet $j^3$ and thence by wire $j^4$, adjustable resistance R$h$ and condenser $j^5$ to main line conductor $b$. The selector magnet has a rocking polarized armature frame J pivoted centrally at $j^6$ and having a spring device $j^7$ applied to it. A two arm drive pawl $k$ on the armature frame operates the selector ratchet wheel $m$. The armature frame also carries an insulated spring contact $n$ connected by wire $n'$ with conductor $j^2$. On the axis of the ratchet wheel and turning therewith is a radial contact arm $o$ connected to ground through a vibrating bell VB. The reverse currents transmitted from the selector battery SB cause the rocking of armature frame J and the step-by-step actuation of the ratchet wheel, there being a sufficient number of such steps to bring the properly set radial arm $o$ into contact with $n$. The detent controlling magnet $j^3$ is so wound as not to respond to the reversals of current but attracts its armature downwardly on the first calling impulse and so retains it until after the impulses have ceased. While the armature is held down the spring controlled detent or back stop pawl $p$ is carried into engagement with the ratchet wheel. When contact $o$ has been stepped around into contact with $n$, lever arm I of the central office selector will have returned to normal position and carried contact $h^3$ into engagement with contact $h^2$. A circuit is thus completed from ground at the sub-station through the vibrating bell VB to the axis of the ratchet wheel $m$, thence to the main line conductor $a$, commutator brushes $d$, $e$, signaling battery SB, normally closed key $h$, signaling device $h'$ and contacts $h^2$, $h^3$ to ground. Contact between $o$ and $n$ will occur on the last step actuation of the ratchet wheel $m$ by the drive pawl on the rocking armature frame at the selected station and current in the ground circuit then established will be of a polarity to hold the armature frame in such final position in which the drive pawl locks or holds the ratchet wheel. The vibrating bell VB of the selected station will now continue to ring until this circuit is broken which may be effected by the opening of key $h$ at the central office after that office and the sub-station operator are in telephonic communication. On the opening of the ground circuit, spring $j^7$ applied to the armature frame moves it away from the ratchet wheel which, being released, is returned to zero position by the re-action of its usual spring. The interruptions of the ground signal circuit during the operation of the vibrating signal bell are so brief that the selector magnet is not deënergized.

The telephone outfit, bridged across the conductors $a$, $b$, for the central office operator is indicated by T and the circuits all being ordinary and well understood, it is unnecessary to describe them in detail. There is no local battery. A like telephone outfit T' is provided for each of the sub-stations. The common telephone battery TB is bridged across the conductors $a$, $b$, one pole thereof being connected to conductor $b$ and the other through a resistance R$h'$ to conductor $a$. If the line be of considerable length with numerous sub-stations there may be several common telephone batteries,—for instance one adjacent each end of the line and the other intermediate. The condensers $c^3$, $j^5$, $j^5$ prevent short circuiting of the telephone battery TB.

Experience has demonstrated that the disclosed system of selective calling is satisfactory and efficient and permits the employment of a common telephone battery. The invention is not, however, limited to the particular details of the calling system nor of the transmitter and selectors.

I claim:

1. A telephone system comprising two main conductors, a central station selector generator bridged across the conductors and a condenser in such bridge, selectors at a plurality of sub-stations each also bridged across the conductors and a condenser in each such bridge, a common telephone battery also bridged across the conductors and a telephone equipment at each sub-station also bridged across the conductors.

2. A telephone system comprising two main conductors, a central station selector generator bridged across the conductors and a condenser in such bridge, selectors at a plurality of sub-stations each also bridged across the conductors and a condenser interposed in each such bridge, a common telephone battery also bridged across the conductors, a telephone equipment at each sub-station also bridged across the conductors and a condenser in each telephone bridge connection.

3. A telephone system comprising two main conductors, a central calling station equipped with a calling generator, a bridge connection for the generator, a condenser in said bridge connection, a telephone equipment and a permanent bridge connection across the main conductors that includes the telephone equipment; selectors at a plurality of sub-stations each bridged across the conductors, a condenser in each such bridge, sub-station telephone equipments bridged across the conductors and a common telephone battery also bridged across the conductors.

4. A telephone system comprising two main conductors, a central calling station equipped with a calling generator, a bridge connection including the generator, a condenser in said bridge, a telephone equipment, a permanent bridge connection across the main conductors that includes the telephone equipment and a condenser in the telephone bridge connection; selectors at a plurality of sub-stations each bridged across the conductors, a condenser in each such bridge, sub-station telephone equipments bridged across the conductors, a condenser in each such bridge and a common telephone battery also bridged across the conductors.

5. A telephone system comprising two main conductors, a selector battery in a bridge circuit containing a condenser across the conductors, a plurality of selectors bridged across the conductors and respectively operated by corresponding series of current impulses from said battery and each having a pair of normally open signal contacts brought into contact when stepped around to selected position, a ground circuit from the selected station to the central office including a signal device at the selected station, said signal contacts, one of the main line conductors and the selector battery.

6. A telephone system comprising two main conductors, a selector battery in a bridge circuit containing a condenser across the conductors, a plurality of selectors bridged across the conductors and respectively operated by corresponding series of current impulses from said battery and each having a pair of normally open signal contacts brought into contact when stepped around to selected position, a ground circuit from the selected station to the central office including a signal device at the selected station, said signal contacts, one of the main line conductors, the selector battery, a normally closed key and a signal device at the central office.

In testimony whereof, I have hereunto subscribed my name.

EDWARD E. KLEINSCHMIDT.

Witnesses:
J. H. SCHUACKENBERG,
L. L. BROWNING.